United States Patent
Fujiwara (10) Patent No.: US 9,771,045 B2
(45) Date of Patent: Sep. 26, 2017

(54) VEHICLE SIDE AIRBAG DEVICE

(71) Applicant: TOYOTA JIDOSHA KABUSHIKI KAISHA, Toyota-shi, Aichi-ken (JP)

(72) Inventor: Yusuke Fujiwara, Toyota (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/853,481

(22) Filed: Sep. 14, 2015

(65) Prior Publication Data

US 2016/0090060 A1 Mar. 31, 2016

(30) Foreign Application Priority Data

Sep. 29, 2014 (JP) ................................. 2014-199035

(51) Int. Cl.
| | |
|---|---|
| *B60R 21/231* | (2011.01) |
| *B60R 21/2334* | (2011.01) |
| *B60R 21/2346* | (2011.01) |
| *B60R 21/2338* | (2011.01) |

(52) U.S. Cl.
CPC .... *B60R 21/23138* (2013.01); *B60R 21/2334* (2013.01); *B60R 21/2346* (2013.01); *B60R 2021/23146* (2013.01); *B60R 2021/23382* (2013.01)

(58) Field of Classification Search
CPC ......... B60R 21/23138; B60R 21/2334; B60R 21/2346; B60R 2021/23146; B60R 2021/23382

See application file for complete search history.

(56) References Cited

U.S. PATENT DOCUMENTS

| | | | |
|---|---|---|---|
| 8,047,564 B2* | 11/2011 | Kibat | ................. B60R 21/23138 280/730.2 |
| 8,328,227 B2 | 12/2012 | Shimono | |
| 8,485,550 B2* | 7/2013 | Kino | ..................... B60R 21/207 280/730.2 |
| 2006/0001244 A1 | 1/2006 | Taguchi et al. | |
| 2008/0088118 A1* | 4/2008 | Wipasuramonton | B60R 21/23138 280/728.2 |

(Continued)

FOREIGN PATENT DOCUMENTS

| | | |
|---|---|---|
| DE | 19603106 A1 | 7/1997 |
| DE | 10 2005 028 702 A1 | 3/2006 |

(Continued)

*Primary Examiner* — Faye M Fleming
(74) *Attorney, Agent, or Firm* — Oliff PLC (57) ABSTRACT

A vehicle side airbag device including: inflator that operates to generate gas; airbag that is provided at side section of seatback of vehicle seat, that inflates and deploys using gas generated by the inflator, that protects occupant from at least head to abdominal region, and in which, in inflated and deployed state, rearward sloping portion configured by location at lower end side of front edge portion of the airbag extends diagonally toward vehicle upper rear on progression from lower end toward upper end of the rearward sloping portion; and flow regulating section that is provided at lower section of the airbag, and that ejects gas generated by the inflator from upper ejection opening toward upper section side of the airbag, and from lower ejection opening along lower edge portion of the airbag toward rearward sloping portion side.

11 Claims, 5 Drawing Sheets

(56) References Cited

U.S. PATENT DOCUMENTS

| | | | |
|---|---|---|---|
| 2011/0298201 A1* | 12/2011 | Kobayashi | B60R 21/207 280/736 |
| 2013/0069347 A1* | 3/2013 | Jenny | B60R 21/2346 280/730.1 |
| 2015/0014970 A1* | 1/2015 | Fujiwara | B60R 21/2346 280/730.2 |
| 2015/0158453 A1* | 6/2015 | Fujiwara | B60R 21/207 280/730.2 |
| 2015/0367804 A1* | 12/2015 | Fujiwara | B60R 21/23138 280/730.2 |
| 2016/0101758 A1* | 4/2016 | Fujiwara | B60R 21/23138 280/729 |

FOREIGN PATENT DOCUMENTS

| | | |
|---|---|---|
| DE | 102011113922 A1 | 3/2013 |
| EP | 2397376 A1 | 12/2011 |
| GB | 2309440 A | 7/1997 |
| JP | H09-202203 A | 8/1997 |
| JP | 2000-185620 A | 7/2000 |
| JP | 2001-287614 A | 10/2001 |
| JP | 2001-287615 A | 10/2001 |
| JP | 2006-008016 A | 1/2006 |
| JP | 2006-008064 A | 1/2006 |
| JP | 2006-176021 A | 7/2006 |
| JP | 2014-019320 A | 2/2014 |
| WO | 2013/114591 A1 | 8/2013 |

\* cited by examiner

VEHICLE SIDE AIRBAG DEVICE

CROSS-REFERENCE TO RELATED APPLICATION

This application is based on and claims priority under 35 USC 119 from Japanese Patent Application No. 2014-199035 filed on Sep. 29, 2014, the disclosure of which is incorporated by reference herein.

BACKGROUND

Technical Field

The present invention relates to a vehicle side airbag device.

Related Art

In a vehicle side-collision airbag device (side airbag device) described in Japanese Patent Application Laid-Open (JP-A) No. H09-202203, an airbag main body of a side airbag includes a chest protection section and a head protection section. Gas from an inflator flows into the airbag main body from a gas injection port provided at a rear end portion of the chest protection section. The airbag main body thereby inflates and deploys, and an occupant is protected from the head to the abdominal region by the airbag main body.

In the side airbag device described above, the airbag main body is set with a large dimension in the vehicle height direction, and the structure is such that the head protection section is not directly fixed to a seatback. Thus, in cases in which the flow of gas flowing into the airbag main body from the inflator is not well controlled, the head protection section sways greatly during inflation and deployment, and it is conceivable that the head of the occupant is not stably protected.

SUMMARY

In consideration of the above circumstances, an object of the present invention is to obtain a vehicle side airbag device that contributes to stabilizing deployment behavior of a location of an airbag that protects the head of an occupant.

A vehicle side airbag device of a first aspect of the present invention includes: an inflator that operates to generate gas; an airbag that is provided at a side section of a seatback of a vehicle seat, that inflates and deploys using gas generated by the inflator, that protects an occupant from at least a head to an abdominal region, and in which, in an inflated and deployed state, a rearward sloping portion configured by a location at a lower end side of a front edge portion of the airbag extends diagonally toward a vehicle upper rear on progression from a lower end toward an upper end of the rearward sloping portion; and a flow regulating section that is provided at a lower section of the airbag, and that ejects gas generated by the inflator from an upper ejection opening toward an upper section side of the airbag, and from a lower ejection opening along a lower edge portion of the airbag toward a rearward sloping portion side.

In the first aspect of the present invention, the inflator is operated, and gas is generated by the inflator when, for example, a side-on collision of the vehicle is detected. Gas generated by the inflator is ejected from the upper ejection opening of the flow regulating section provided to the lower section of the airbag toward the upper section side of the airbag, and from the lower ejection opening of the flow regulating section and along the lower edge portion of the airbag toward the rearward sloping portion side of the airbag.

The rearward sloping portion is configured by a location at the lower end side of the front edge portion of the airbag, and extends diagonally toward the vehicle upper rear on progression from the lower end toward the upper end in the inflated and deployed state of the airbag. Thus gas ejected from the lower ejection opening as described above (hereafter referred to as "lower path gas") flows along the rearward sloping portion, thereby enabling the flow direction of the lower path gas to be directed diagonally toward the vehicle upper rear. This accordingly enables a configuration such that an upper portion side of the front edge portion of the airbag does not bear force toward the vehicle front side due to the lower path gas, thereby enabling an upper section side of the airbag to be prevented or suppressed from swaying in the vehicle front-rear direction due to the force toward the vehicle front side. This contributes to stabilizing deployment behavior of the upper section side of the airbag, namely a location that protects the head of the occupant.

A vehicle side airbag device of a second aspect of the present invention is the first aspect, wherein: the airbag is partitioned by a partitioning section serving as the flow regulating section into a rear bag section that protects rear portions of a chest region and the abdominal region of the occupant, and into a front bag section that protects front portions of the chest region and the abdominal region of the occupant, and the head of the occupant; the inflator is housed inside the rear bag section; and the inside of the front bag section and the inside of the rear bag section are placed in communication with each other by the upper ejection opening formed at an upper end portion of the partitioning section, and the lower ejection opening formed at a lower end portion of the partitioning section.

In the second aspect of the present invention, the airbag is partitioned into the front bag section and the rear bag section by the partitioning section serving as the flow regulating section, and the inflator is housed inside the rear bag section. Gas generated by the inflator inside the rear bag section is ejected from the upper ejection opening formed to the upper end portion of the partitioning section into the front bag section, and from the lower ejection opening formed to the lower end portion of the partitioning section into the front bag section.

In the present aspect, during operation of the inflator, the rear bag section housing the inflator inside is thereby inflated and deployed at an earlier stage and at a higher pressure, thereby enabling the lower pressure front bag section with delayed inflation and deployment to be supported by the higher pressure rear bag section. This contributes to stably inflating and deploying an upper portion side of the front bag section, namely the location that protects the head of the occupant, from bottom to top.

A vehicle side airbag device of a third aspect of the present invention is the first aspect, wherein an angle formed between a front end portion of the lower edge portion of the airbag, and a lower end portion of the rearward sloping portion is set at a right angle or an acute angle.

In the third aspect of the present invention, the angle formed between the lower end portion of the rearward sloping portion provided at the front edge portion of the airbag, and the front end portion of the lower edge portion of the airbag is set as described above. This enables the flow direction of the lower path gas to be effectively directed diagonally toward the vehicle upper rear due to impinging on the rearward sloping portion.

A vehicle side airbag device of a fourth aspect of the present invention is the first aspect, wherein the airbag includes a curved portion provided between a front end of the lower edge portion and the lower end of the rearward sloping portion, and the curved portion is formed in a curved shape forming a bulge toward a vehicle front side in the inflated and deployed state.

In the fourth aspect of the present invention, the lower path gas, flowing toward the vehicle front side along the lower edge portion of the airbag as described above, impinges on the curved portion, thereby enabling the lower path gas to be smoothly guided toward the rearward sloping portion side. This enables the flow direction of the lower path gas to be smoothly directed diagonally toward the vehicle upper rear.

As explained above, a vehicle side airbag device according to the present invention contributes to stabilizing deployment behavior of a location of an airbag that protects the head of an occupant.

BRIEF DESCRIPTION OF THE DRAWINGS

Exemplary embodiments of the present invention will be described in detail based on the following figures, wherein.

DETAILED DESCRIPTION

Figure 1:
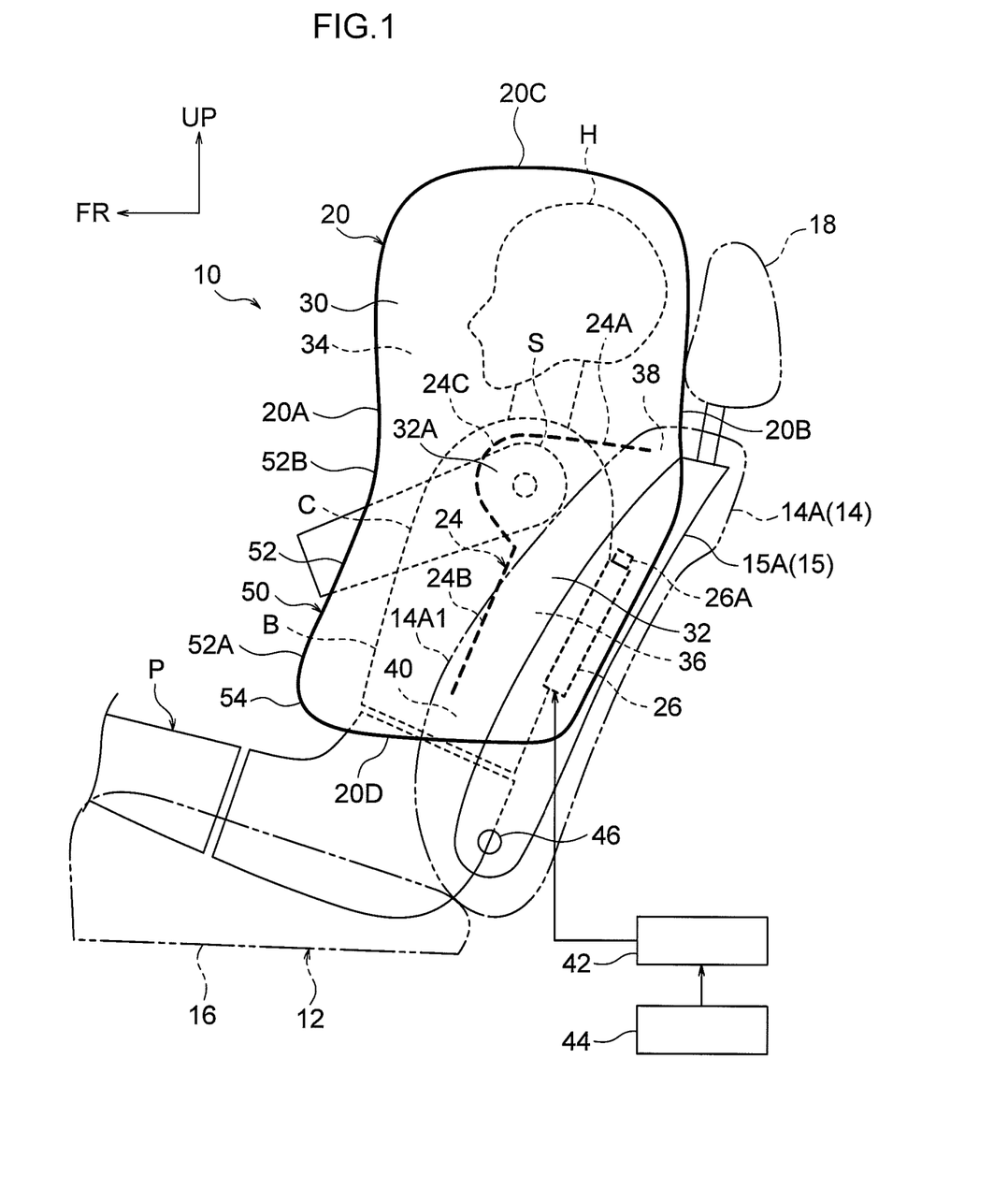
FIG. 1 is a side view of a vehicle seat installed with a vehicle side airbag device according to an exemplary embodiment of the present invention, illustrating an inflated and deployed state of an airbag.
Figure 2:
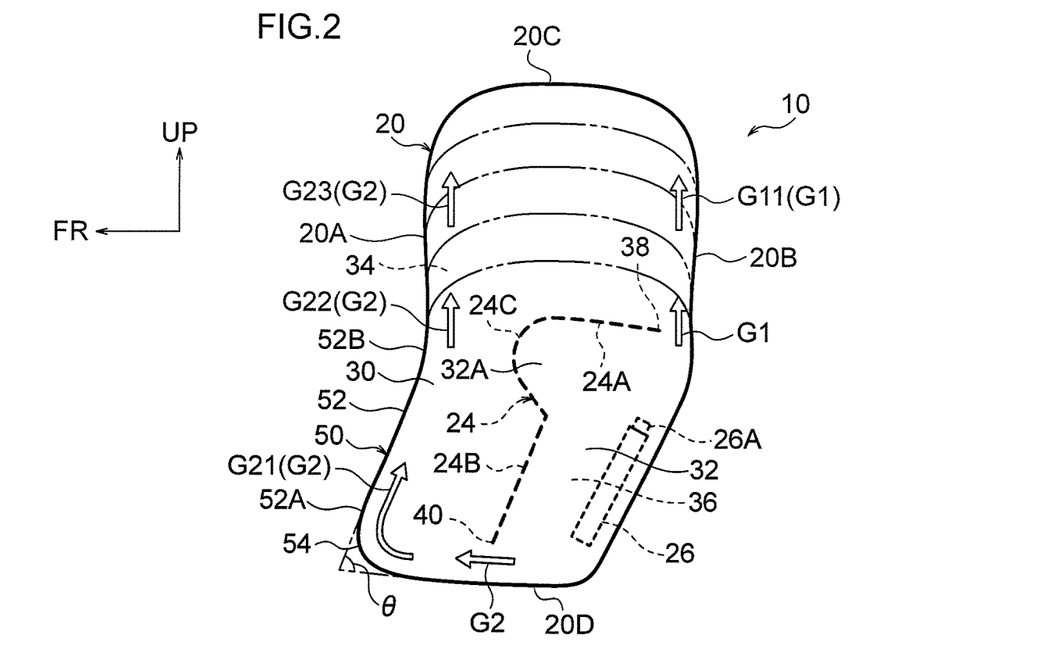
FIG. 2 is a side view corresponding to a portion of FIG. 1, for explaining a flow of gas inside the airbag on operation of an inflator in the vehicle side airbag device.
Figure 3:
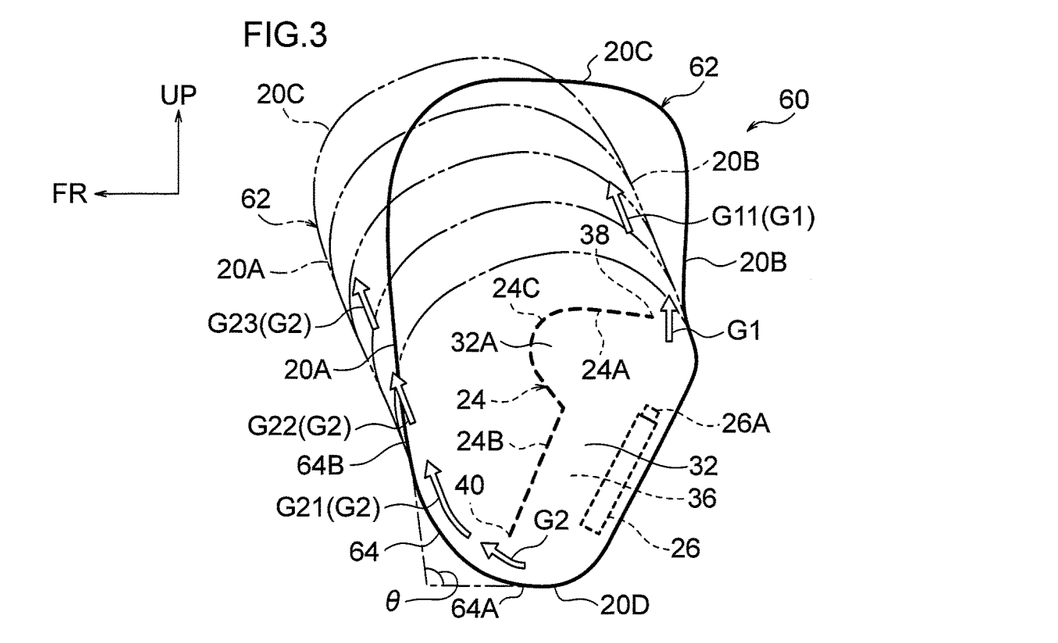
FIG. 3 is a side view corresponding to FIG. 2, for explaining a flow of gas inside an airbag on operation of an inflator in a vehicle side airbag device according to a Comparative Example.

Explanation follows regarding a vehicle side airbag device 10 according to an exemplary embodiment of the present invention, with reference to FIG. 1 to FIG. 3. Note that in each of the drawings, the arrow FR and the arrow UP indicate, as appropriate, the front direction (direction of progress) and the upper direction of the vehicle, respectively. Unless specifically stated otherwise, reference simply to the front-rear and up-down directions in the below explanation refer to front-rear in the vehicle front-rear direction, and up-down in the vehicle up-down direction.

Configuration

As illustrated in FIG. 1, the vehicle side airbag device 10 according to the present exemplary embodiment is what is referred to as a far side airbag, and is installed to a vehicle center-side side support section 14A (vehicle width direction center-side side section, hereafter simply referred to as "center-side side section 14A") of a seatback 14 of a vehicle seat 12. The vehicle seat 12 is, for example, a driving seat in a right-hand drive vehicle. The seatback 14 of the vehicle seat 12 is reclinably coupled to a rear end section of a seat cushion 16 by a reclining device, not illustrated in the drawings, and an upper end section of the seatback 14 is coupled to a headrest 18.

Note that in the present exemplary embodiment, the front-rear direction, left-right direction (width direction), and up-down direction of the vehicle seat 12 are aligned with the front-rear direction, left-right direction (width direction), and up-down direction of the vehicle. In FIG. 1, a crash test dummy P is illustrated seated in the vehicle seat 12 instead of an actual occupant. The dummy P is, for example, a World Side Impact Dummy (World SID) of an American $50^{th}$ percentile adult male (AM50). The dummy P is seated in a standard seated posture specified in collision testing methods. A front-rear position of the seat cushion 16 with respect to the vehicle, and a slope position (slope angle) of the seatback 14 with respect to the seat cushion 16, are adjusted to reference set positions corresponding to the seated posture. In order to facilitate understanding of the explanation, the dummy P is hereafter referred to as "occupant P".

The vehicle far side airbag device 10 is a device mainly for protecting an occupant at the opposite side to a collision side in the event of a side-on collision of the vehicle, and includes an airbag 20 (far side airbag, bag body) installed at the center-side side section 14A. A tether 24 (partitioning cloth, partitioning member) serving as a partitioning section, and an inflator 26 (gas generator) are installed inside the airbag 20.

The airbag 20 configures a module together with the tether 24 and the inflator 26, and, in a folded state, is installed (housed) inside the center-side side section 14A. The airbag 20 inflates and deploys toward the vehicle width direction center side of the occupant P (the front side of the center-side side section 14A) due to pressure from gas generated by the inflator 26 (the state illustrated in FIG. 1). A seatback pad and a seat cover (neither of which are illustrated in the drawings) installed to the center-side side section 14A are configured so as to rupture under inflation pressure of the airbag 20 during inflation and deployment. Note that in the explanation below, unless specifically stated otherwise, front-rear and up-down directions of the airbag 20 refer to directions of the airbag 20 in the inflated and deployed state, and are substantially aligned with the front-rear and up-down directions of the seatback 14.

The airbag 20 is formed in an elongated bag shape by folding a base cloth, formed by cutting out a cloth material made of nylon thread or polyester thread, for example, in two and stitching together outer peripheral edge portions of the folded base cloth. When viewed from the side of a side face (the vehicle width direction center side in this example) in the inflated and deployed state illustrated in FIG. 1, the airbag 20 is formed in an elongated, substantially rectangular shape along the vehicle up-down direction, capable of protecting (restraining) the occupant P from the head H to the abdominal region B. Note that FIG. 1 illustrates a state directly before the airbag 20 restrains the occupant P from the head H to the abdominal region B (a non-restraining inflated and deployed state, hereafter simply referred to as "inflated and deployed state"). Explanation follows regarding the shape of the airbag 20 in the inflated and deployed state.

The airbag 20 is formed such that upper portion sides of a front edge portion 20A and a rear edge portion 20B extend in parallel, or substantially in parallel, to along the vehicle up-down direction, and lower portion sides of the front edge portion 20A and the rear edge portion 20B extend parallel, or substantially parallel, to along the up-down direction of the seatback 14. The airbag 20 is also formed such that an upper edge portion 20C and a lower edge portion 20D extend in parallel, or substantially in parallel, along substantially the vehicle front-rear direction.

The airbag 20 includes a gas impeding section 50 configured by a location at a lower end side of the front edge portion 20A. The gas impeding section 50 is configured by a rearward sloping portion 52 and a curved portion 54. The rearward sloping portion 52 is formed extending diagonally toward the vehicle upper rear from a lower end 52A toward an upper end 52B. An angle θ formed between a lower end portion of the rearward sloping portion 52 and a front end portion of the lower edge portion 20D is set at a right angle or an acute angle (an acute angle in this example). The upper end 52B of the rearward sloping portion 52 is set in the vicinity of an up-down direction center portion of the front edge portion 20A. The front edge portion 20A is formed bent or curved in the vicinity of the upper end 52B of the rearward sloping portion 52 (in the vicinity of the up-down direction center portion) so as to form an indent toward the vehicle rear side.

The curved portion 54 is provided between the lower end 52A of the rearward sloping portion 52 and a front end of the lower edge portion 20D, and is formed in a curved shape forming a bulge toward the vehicle front side. Namely, the curved portion 54 is formed bending toward the vehicle upper side while curving to form a bulge from the front end of the lower edge portion 20D toward the vehicle front side. The rearward sloping portion 52 is configured extending from an upper end of the curved portion 54 diagonally toward the vehicle upper rear.

Note that, when the seatback 14 is viewed along the vehicle width direction, the up-down direction of the seatback 14 is a direction connecting the vehicle front-rear direction center of an upper end portion of a seatback frame 15, this being a frame of the seatback 14, to the axial center of a connecting rod 46 provided to the reclining device. The occupant P is seated in the vehicle seat 12 with a posture in which the torso line of the occupant P is parallel, or substantially parallel, to the up-down direction of the seatback 14.

The above-mentioned tether 24 is provided at a lower section inside the airbag 20 configured as described above. The tether 24 is formed by cutting a similar cloth material to the base cloth of the airbag 20 into an elongated belt shape, with one long end edge portion stitched to one side portion of the base cloth of the airbag 20, and the other long end edge portion stitched to the other side portion of the base cloth of the airbag 20.

The airbag 20 is partitioned by the tether 24 into a front bag section 30 for protecting (restraining) the occupant P at front portions of the chest C and abdominal region B, and at the head H, and a rear bag section 32 for protecting (restraining) the occupant P at rear portions of the chest C and abdominal region B, and at the shoulder region S. A front chamber 34 is configured inside the front bag section 30, and a rear chamber 36 is configured inside the rear bag section 32. Note that a configuration may be applied in which a stitched portion (seam), serving as a partitioning section, is set instead of the tether 24. Namely, the airbag 20 may be configured partitioned into the front bag section 30 and the rear bag section 32 by a stitched portion stitched to the one side portion and the other side portion of the base cloth of the airbag 20.

In the inflated and deployed state of the airbag 20 illustrated in FIG. 1, the tether 24 includes a crosswise extension portion 24A extending from an up-down direction intermediate portion of the rear edge portion 20B of the airbag 20 toward the vehicle front side, and an upright extension portion 24B extending from a front-rear direction intermediate portion of the lower edge portion 20D of the airbag 20 toward the upper side of the seatback 14. The upright extension portion 24B is set parallel, or substantially parallel, to the above-mentioned rearward sloping portion 52 in the inflated and deployed state of the airbag 20. Moreover, the upright extension portion 24B is set to extend along the up-down direction of the seatback 14 in the vicinity of a front edge portion 14A1 (what is referred to as a frame portion) of the center-side side section 14A in the inflated and deployed state of the airbag 20.

The tether 24 also includes a circular arc shaped portion 24C provided between a front end of the crosswise extension portion 24A and an upper end of the upright extension portion 24B. In the side view illustrated in FIG. 1, the circular arc shaped portion 24C forms a circular arc shape forming a bulge at the front side of the seatback 14, set projecting out further toward the vehicle front side than the upright extension portion 24B, and projecting much further toward the vehicle front side than the front edge portion 14A1 of the center-side side section 14A.

In the inflated and deployed state of the airbag 20 illustrated in FIG. 1, the rear bag section 32 faces the occupant P at the rear portions of the chest C and abdominal region B, and at the shoulder region S, from the vehicle width direction center side, and the front bag section 30 faces the occupant P at the front portions of the chest C and abdominal region B, and at the head H from the vehicle width direction center side. In this state, the upright extension portion 24B of the tether 24 faces the occupant P at vehicle front-rear direction intermediate portions of the chest C and abdominal region B from the vehicle width direction center side. The circular arc shaped portion 24C of the tether 24 projects out further toward the vehicle front side (the front side of the seatback 14) than the upright extension portion 24B, such that a shoulder restraint portion 32A, provided at an upper portion of the rear bag section 32, projects out further toward the vehicle front side than a lower portion of the rear bag section 32 (a location that restrains the rear portions of the chest C and the abdominal region B in this example).

An upper side communication opening 38 (inner vent hole), placing the upper portion inside the rear bag section 32 and an upper portion inside the front bag section 30 in communication with each other along the up-down direction of the airbag 20, is formed at a rear end portion of the crosswise extension portion 24A configuring the upper end portion of the tether 24. A lower side communication opening 40 (inner vent hole), placing a lower end portion inside the rear bag section 32 and a lower end portion inside the front bag section 30 in communication with each other along the front-rear direction of the airbag 20, is formed at a lower end portion of the upright extension portion 24B that is the lower end portion of the tether 24. The upper side communication opening 38 corresponds to an "upper ejection opening" according to the present invention, and the lower side communication opening 40 corresponds to a "lower ejection opening" according to the present invention. In the present exemplary embodiment, an opening surface area of the lower side communication opening 40 is set larger than that of the upper side communication opening 38.

Note that in FIG. 1 and FIG. 2, the crosswise extension portion 24A and the upright extension portion 24B are omitted from illustration at locations where the upper side communication opening 38 and the lower side communication opening 40 are formed in order to make the drawings easier to view. However, portions of the crosswise extension portion 24A and the upright extension portion 24B are present at the locations where the communication openings 38, 40 are formed. In the present exemplary embodiment, the upper side communication opening 38 is formed to the rear end portion of the crosswise extension portion 24A; however configuration is not limited thereto, and the upper side communication opening 38 may be formed to a front-rear direction intermediate portion of the crosswise extension portion 24A, or to a front end portion of the crosswise extension portion 24A.

As illustrated in FIG. 1 and FIG. 2, the inflator 26 is what is referred to as a cylinder type inflator, and is formed in a circular cylindrical shape. The inflator 26 is housed at a rear edge side of the lower section inside the airbag 20, and is disposed at a rear end side inside the rear bag section 32 oriented with its axial line direction along the up-down direction of the seatback 14.

A pair of upper and lower stud bolts (not illustrated in the drawings) project out from outer peripheral portions of the inflator 26 toward the vehicle width direction outside. The stud bolts pierce through the base cloth of the bag body 22 and a side frame 15A of the seatback frame 15, and nuts, not illustrated in the drawings, are screwed onto leading end sides of the stud bolts. The inflator 26 is thereby fastened and fixed to the seatback frame 15 together with the airbag 20.

As illustrated in FIG. 1, the inflator 26 is electrically connected to an ECU 42 (controller) installed to the vehicle. A side collision sensor 44 that detects a side-on collision of the vehicle is electrically connected to the ECU 42. The ECU 42 and the side collision sensor 44 are configuration members of the vehicle side airbag device 10.

The ECU 42 is configured to operate (actuate) the inflator 26 when (the inevitability of) a side-on collision of the vehicle has been detected based on a signal from the side collision sensor 44. Specifically, since the vehicle side airbag device 10 according to the present exemplary embodiment is installed to the vehicle seat 12 that is the driving seat in a right-hand drive vehicle, the inflator 26 is actuated when the ECU 42 detects that another vehicle has collided with a side section (left side section) at a front passenger seat side of the vehicle. Note that, in cases in which a pre-crash sensor that predicts (forecasts) a side-on collision is electrically connected to the ECU 42, the inflator 26 may be configured to be actuated when the ECU 42 has predicted a side-on collision based on a signal from the pre-crash sensor.

On actuation of the inflator 26, gas is ejected in radiating directions into the rear bag section 32 from a gas ejection portion 26A provided to one of either an upper end portion or a lower end portion of the inflator 26 (the upper end portion in this example). The rear bag section 32 accordingly starts to inflate and deploy prior to the front bag section 30. A portion of the gas ejected from the gas ejection portion 26A into the rear bag section 32 is ejected from the upper side communication opening 38, formed to the upper end portion of the tether 24, into an upper section side of the airbag 20 (vehicle upper side), and is supplied to the upper portion inside the front bag section 30 (see the arrow G1 in FIG. 2). A portion of the gas ejected from the gas ejection portion 26A into the rear bag section 32 is ejected from the lower side communication opening 40 formed to the lower end portion of the tether 24, along the lower edge portion 20D of the airbag 20, toward the side of the above-mentioned gas impeding section 50 (vehicle front side), and is supplied to the lower end portion inside the front bag section 30 (see the arrow G2 in FIG. 2). The front bag section 30 accordingly starts to inflate and deploy with a delay to the rear bag section 32.

In this example, gas ejected from the inflator 26 is supplied into the front bag section 30 through the upper and lower communication openings 38, 40 after being supplied into the rear bag section 32, such that the internal pressure of the rear bag section 32 becomes higher than the internal pressure of the front bag section 30. Namely, in the present exemplary embodiment, an internal pressure adjustment means that makes the internal pressure of the rear bag section 32 higher than the internal pressure of the front bag section 30 is configured by providing the inflator 26 inside the rear bag section 32, and by forming the upper and lower communication openings 38, 40 to the tether 24.

In the present exemplary embodiment, as previously described, the opening surface area of the lower side communication opening 40 is set larger than the opening surface area of the upper side communication opening 38. Thus a flow rate of gas G2 supplied to the lower end portion inside the front bag section 30 through the lower side communication opening 40 (hereafter referred to as "lower path gas G2") is configured to be greater than a flow rate of gas G1 supplied to the upper portion inside the front bag section 30 through the upper side communication opening 38 (hereafter referred to as "upper path gas G1"). The lower path gas G2 that is set with a greater flow rate in this manner is configured to impinge on (blow against) the gas impeding section 50 previously described.

Operation and Advantageous Effects

Explanation follows regarding operation and advantageous effects of the first exemplary embodiment.

In the vehicle side airbag device 10 with the above configuration, when the ECU 42 detects a side-on collision based on a signal from the side collision sensor 44, the inflator 26 is actuated by the ECU 42, and gas is ejected from the gas ejection portion 26A of the inflator 26 into the rear bag section 32. The upper path gas G1, this being a portion of the gas ejected into the rear bag section 32, is ejected from the upper side communication opening 38, formed to the upper end portion of the tether 24, to the upper section side of the airbag 20, and is supplied to the upper portion of the front bag section 30. The lower path gas G2, this being a portion of the gas ejected into the rear bag section 32, is ejected from the lower side communication opening 40, formed to the lower end portion of the tether 24, along the lower edge portion 20D, toward the side of the gas impeding section 50 of the airbag 20, and is supplied to the lower end portion of the front bag section 30.

The gas impeding section 50 is configured by a location at the lower end side of the front edge portion 20A of the airbag 20, and includes the rearward sloping portion 52 extending diagonally toward the vehicle upper rear from the lower end 52A toward the upper end 52B in the inflated and deployed state of the airbag 20. Since the lower path gas G2 ejected from the lower side communication opening 40 flows along the rearward sloping portion 52 in this manner, the direction in which the lower path gas G2 flows can be directed diagonally toward the vehicle upper rear (see the arrow G21 in FIG. 2).

This accordingly enables a configuration such that the upper portion side of the front edge portion 20A does not bear force toward the vehicle front side, since the lower path gas G2 flows along the front edge portion 20A toward the vehicle upper side (see the arrows G22, G23 in FIG. 2), thereby enabling the upper section side of the airbag 20 to be prevented or suppressed from swaying in the vehicle front-rear direction due to the force toward the vehicle front side. This contributes to stabilizing deployment behavior of the upper section side of the airbag 20, namely a location that protects the head H.

Namely, in the present exemplary embodiment, the upper section side of the airbag 20 can be stably inflated and deployed from bottom to top (in the arrow UP direction in FIG. 1 and FIG. 2), due to the upper path gas G1 (see the arrows G1, G11 in FIG. 2) and the lower path gas G2 (see the arrows G2, G21, G22, and G23 in FIG. 2) (see the double-dotted dashed lines in FIG. 2). Since the head H of the occupant P can be stably protected by the airbag 20 as a result, this contributes to improving occupant protection performance by the airbag 20.

Explanation follows regarding the above advantageous effect, with reference to a Comparative Example 60 illustrated in FIG. 3. In FIG. 3, configuration that is basically the same as that of the present exemplary embodiment is appended with the same reference numerals. An airbag 62 according to the Comparative Example 60 is provided with a forward sloping portion 64, configured by the lower end portion of the front edge portion 20A and the front end portion of the lower edge portion 20D, instead of the gas impeding section 50 according to the present exemplary embodiment. The forward sloping portion 64 is formed in a curved shape forming a bulge diagonally toward the vehicle lower front in an inflated and deployed state of the airbag 62, and is formed extending diagonally toward the vehicle upper front from a lower end 64A toward an upper end 64B. In the airbag 62, an angle θ formed between a location of the front edge portion 20A further toward the upper side than the forward sloping portion 64, and the front end portion of the lower edge portion 20D, is set at an obtuse angle. Configuration of the airbag 62 other than that described above is basically the same as that of the airbag 20 according to the present exemplary embodiment.

In the Comparative Example 60, lower path gas G2 ejected from the lower side communication opening 40 toward the forward sloping portion 64 side flows along the forward sloping portion 64 diagonally toward the vehicle upper front (see the arrow G21 in FIG. 3). The upper portion side of the front edge portion 20A accordingly bears force toward the vehicle front side from the lower path gas G2 (see the arrows G22, G23 in FIG. 3), and, as illustrated by the double-dotted dashed lines in FIG. 3, an upper section side of the airbag 62 tends to inflate and deploy diagonally toward the vehicle upper front. In the Comparative Example 60, the upper section side of the airbag 20 sways in the vehicle front-rear direction as a result, and it is conceivable that the deployment behavior of the upper section side of airbag 62 (a head protection section) becomes unstable. However, this can be avoided in the present exemplary embodiment.

In the present exemplary embodiment, the airbag 20 is partitioned into the front bag section 30 and the rear bag section 32 by the tether 24, and the inflator 26 is housed inside the rear bag section 32. During inflation and deployment of the airbag 20, the rear bag section 32 that houses the inflator 26 is thereby inflated and deployed at an earlier stage and at a higher pressure than the front bag section 30, thereby enabling the lower pressure front bag section 30 with delayed inflation and deployment to be supported by the higher pressure rear bag section 32. This enables the front bag section 30 to be prevented or suppressed from swaying. The flow of gas from the higher pressure rear bag section 32 to the lower pressure front bag section 30 can be regulated by the upper and lower communication openings 38, 40 formed to the tether 24. This accordingly further contributes to the advantageous effect of stabilizing the deployment behavior of the airbag 20.

In the present exemplary embodiment, the upper side communication opening 38 places the upper end portion inside the rear bag section 32 and the upper portion inside the front bag section 30 in communication with each other along the up-down direction of the airbag 20, and the lower side communication opening 40 places the lower end portion inside the rear bag section 32 and the lower end portion inside the front bag section 30 in communication with each other along the front-rear direction of the airbag 20. Configuration can accordingly be made such that the lower path gas G2 supplied to the lower end portion inside the front bag section 30 through the lower side communication opening 40 does not unintentionally impinge on the upper path gas G1 supplied to the upper portion inside the front bag section 30 through the upper side communication opening 38. This accordingly also contributes to the advantageous effect of stabilizing the deployment behavior of the airbag 20.

In the present exemplary embodiment, gas is supplied to the upper portion inside the front bag section 30 through two paths, these being the upper path gas G1 and the lower path gas G2, with the flow rate of the lower path gas G2 set higher than the flow rate of the upper path gas G1. This enables the flow rates of the upper path gas G1 and the lower path gas G2 supplied to the upper portion of the front bag section 30 to be well balanced, thereby contributing to stably inflating and deploying the front bag section 30 from bottom to top.

In the present exemplary embodiment, the angle θ formed between the lower end portion of the rearward sloping portion 52 provided to the gas impeding section 50, and the front end portion of the lower edge portion 20D of the airbag 20, is set at an acute angle. This enables the flow direction of the lower path gas G2 to be effectively directed diagonally toward the vehicle upper rear due to impinging on the gas impeding section 50.

In the present exemplary embodiment, the gas impeding section 50 includes the curved portion 54 provided between the front end of the lower edge portion 20D of the airbag 20, and the lower end of the rearward sloping portion 52. The curved portion 54 curves so as to form a bulge toward the vehicle front side in the inflated and deployed state of the airbag 20. The lower path gas G2 flowing along the lower edge portion 20D of the airbag 20 toward the vehicle front side thereby impinges on the curved portion 54, enabling the lower path gas G2 to be smoothly guided toward the rearward sloping portion 52 side (see the arrow G21 in FIG. 2). This enables the flow direction of the lower path gas G2 to be smoothly directed diagonally toward the vehicle upper rear.

In the present exemplary embodiment, the shoulder restraint portion 32A provided at the upper portion of the rear bag section 32 projects out further toward the front side of the seatback 14 than the lower portion of the rear bag section 32 (namely, at locations for restraining the occupant P at the rear portions of the chest C and the abdominal region B). This enables a wide surface area to be secured in the higher pressure rear bag section 32 for restraining the shoulder region S, thereby enabling the shoulder region S, with a load resilience that is relatively higher than those of the chest C and the abdominal region B, to be effectively protected (restrained) by the higher pressure rear bag section 32. This accordingly contributes to improving the occupant restraint performance by the airbag 20.

In the present exemplary embodiment, in the inflated and deployed state of the airbag 20, the upright extension portion 24B of the tether 24 is set so as to extend along the up-down direction of the seatback 14 in the vicinity of the front edge portion 14A1 of the center-side side section 14A. Thus even if the airbag 20 is inflated and deployed in a state in which the head of a child, etc. is present in an unsuitable position (out of position (OOP)) toward the vehicle front of the center-side side section 14A, a contribution is made to reducing load from the rear bag section 32 borne by the head of the child, etc., thereby contributing to what is referred to as OOP performance.

Explanation follows regarding various modified examples of the above exemplary embodiment. Note that configuration and operation that is basically the same as that of the above exemplary embodiment is appended with the same reference numerals as the above exemplary embodiment, and explanation thereof is omitted.

First Modified Example

Figure 4:
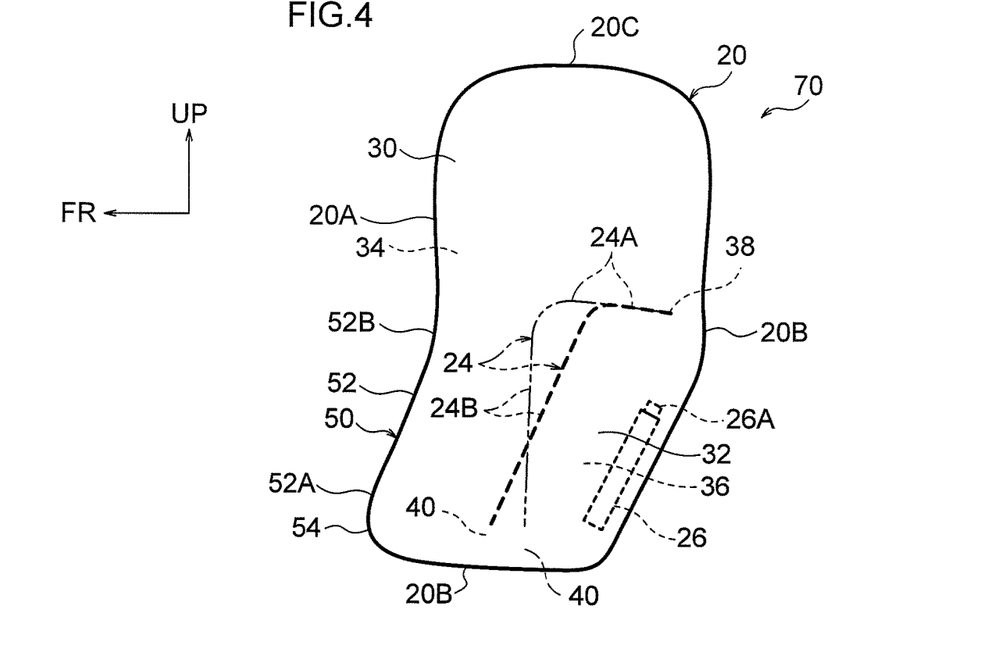
FIG. 4 is a side view corresponding to FIG. 2 and illustrating a first modified example of a vehicle side airbag device according to an exemplary embodiment of the present invention.

FIG. 4 is a side view corresponding to FIG. 2 and illustrating a first modified example 70 of a vehicle side airbag device according to an exemplary embodiment of the present invention. In the first modified example 70, the tether 24 does not include the circular arc shaped portion 24C, the upper end of the upright extension portion 24B is contiguous to the front end of the crosswise extension portion 24A, and the shoulder restraint portion 32A is omitted. In the first modified example 70, in the inflated and deployed state of the airbag 20, the projection amount of the rear bag section 32 from the front edge portion 14A1 of the center-side side section 14A (omitted from illustration in FIG. 4) can be reduced or set to zero. This enables the above-mentioned OOP performance to be improved. Note that the tether 24 (partitioning section) may be set as illustrated by the double-dotted dashed line in FIG. 4.

Second Modified Example

Figure 5:
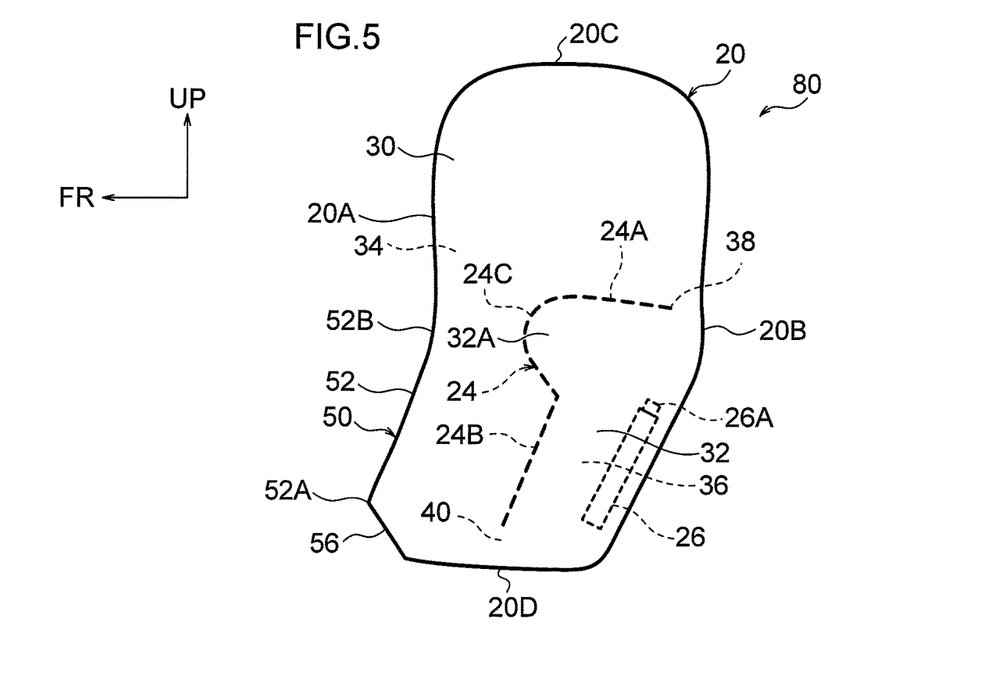
FIG. 5 is a side view corresponding to FIG. 2 and illustrating a second modified example of a vehicle side airbag device according to an exemplary embodiment of the present invention.

FIG. 5 is a side view corresponding to FIG. 2, illustrating a second modified example 80 of a vehicle side airbag device according to an exemplary embodiment of the present invention. In the second modified example 80, the gas impeding section 50 includes a forward sloping portion 56 instead of the curved portion 54 according to the previous exemplary embodiment. The forward sloping portion 56 is formed extending diagonally toward the vehicle upper front from the front end of the lower edge portion 20D in the inflated and deployed state of the airbag 20, and an upper end of the forward sloping portion 56 is contiguous to the lower end 52A of the rearward sloping portion 52. The second modified example 80 also enables basically the same advantageous effects to be obtained to those of the previous exemplary embodiment.

Third Modified Example

Figure 6:
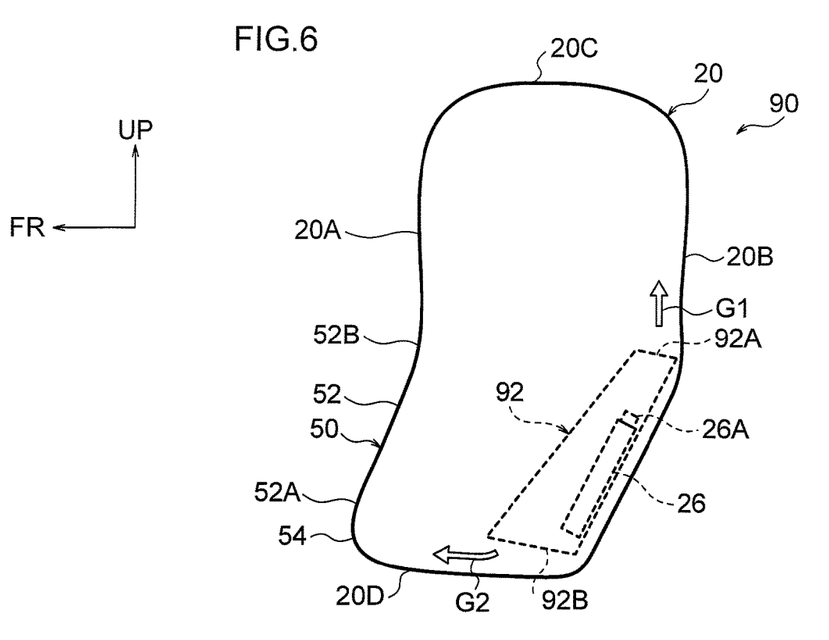
FIG. 6 is a side view corresponding to FIG. 2 and illustrating a third modified example of a vehicle side airbag device according to an exemplary embodiment of the present invention.

FIG. 6 is a side view corresponding to FIG. 2 and illustrating a third modified example 90 of a vehicle side airbag device according to an exemplary embodiment of the present invention. In the third modified example 90, a loop diffuser 92, serving as a flow regulating section, is provided instead of the tether 24 according to the previous exemplary embodiment. The loop diffuser 92 is also referred to as an inner tube, or a flow regulating cloth. The loop diffuser 92 is formed in the shape of a trumpet shaped tube using a similar cloth material to the base cloth of the airbag 20, for example, and is fixed to the side frame 15A by the inflator 26 housed inside. The loop diffuser 92 is formed with a truncated cone shaped external profile that increases in diameter on progression from an upper end opening 92A toward a lower end opening 92B. The upper end opening 92A corresponds to an "upper ejection opening" of the present invention, and the lower end opening 92B corresponds to a "lower ejection opening" of the present invention.

The loop diffuser 92 causes gas ejected from the inflator 26 to be ejected from the upper end opening 92A, along the rear edge portion 20B of the airbag 20, to the upper section side of the airbag 20 (vehicle upper side), and to also be ejected from the lower end opening 92B, along the lower edge portion 20D of the airbag 20, to the gas impeding section 50 side (vehicle front side). Since an opening surface area of the lower end opening 92B is set larger than an opening surface area of the upper end opening 92A, a flow rate of gas ejected from the lower end opening 92B (lower path gas) is configured greater than a flow rate of gas ejected from the upper end opening 92A (upper path gas). In the third modified example, similar operation and advantageous effects to those in the first exemplary embodiment can be obtained, other than the operation and advantageous effects obtained by partitioning the airbag 20 into the higher pressure rear bag section 32 and the lower pressure front bag section 30 as in the first exemplary embodiment. Moreover, manufacturing is easier and the structure is simpler in cases in which the loop diffuser 92 is employed than in cases in which that tether 24 is employed, thereby enabling a reduction in costs to be achieved.

Fourth Modified Example

Figure 7:
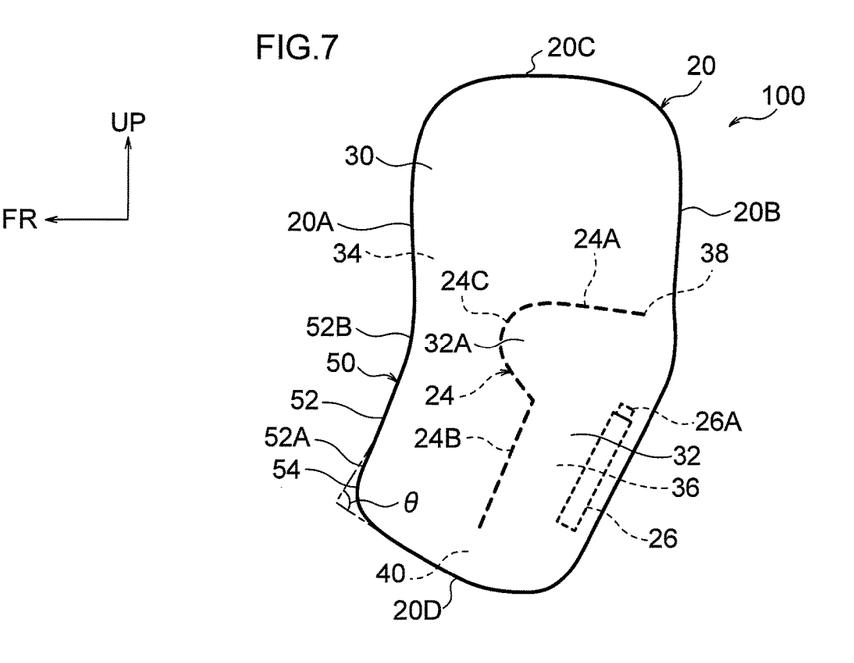
FIG. 7 is a side view corresponding to FIG. 2 and illustrating a fourth modified example of a vehicle side airbag device according to an exemplary embodiment of the present invention.

FIG. 7 is a side view corresponding to FIG. 2 and illustrating a fourth modified example 100 of a vehicle side airbag device according to an exemplary embodiment of the present invention. In the fourth modified example 100, in the inflated and deployed state of the airbag 20, the lower edge portion 20D is formed sloping upward toward the front with respect to the vehicle front-rear direction, and an angle θ formed between the front end portion of the lower edge portion 20D and the lower end portion of the rearward sloping portion 52 is set at an obtuse angle. In the fourth modified example too, gas ejected from the lower side communication opening 40 (lower path gas) flows along the rearward sloping portion 52, thereby enabling the flow direction of the lower path gas to be directed diagonally toward the vehicle upper rear. This enables basically the same operation and advantageous effects to be obtained to those in the first exemplary embodiment.

Fifth Modified Example

Figure 8:
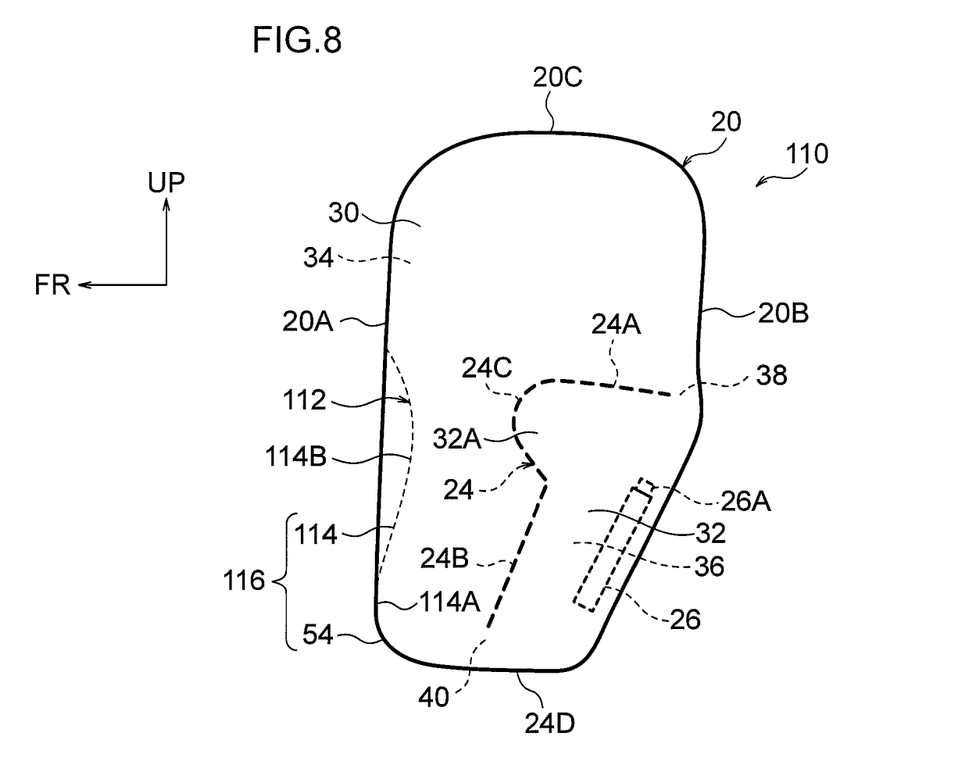
FIG. 8 is a side view corresponding to FIG. 2 and illustrating a fifth modified example of a vehicle side airbag device according to an exemplary embodiment of the present invention.

FIG. 8 is a side view corresponding to FIG. 2 and illustrating a fifth modified example 110 of a vehicle side airbag device according to an exemplary embodiment of the present invention. In the fifth modified example 110, in the inflated and deployed state of the airbag 20, the front edge portion 20A is formed along the vehicle up-down direction, and the rearward sloping portion 52 according to the previous exemplary embodiment is omitted. Instead of this, a stitched portion 112 is set spanning from a lower end portion to an up-down direction intermediate portion of the front edge portion 20A, and the one side portion and the other side portion of the airbag 20 are stitched together by the stitched portion 112. The stitched portion 112 includes a rearward sloping portion 114. The rearward sloping portion 114 is set so as to, in the inflated and deployed state of the airbag 20, extend diagonally toward the vehicle upper rear from a lower end 114A toward an upper end 114B. The rearward sloping portion 114 configures a gas impeding section 116 together with the curved portion 54. The fifth modified example also enables basically the same operation and advantageous effects to be obtained to those in the first exemplary embodiment.

Note that, in the previous exemplary embodiment and each of the modified examples, examples have been explained in which the present invention is applied to what is referred to as a far side airbag device. However configuration is not limited thereto, and the present invention may also be applied to what is referred to a nearer side airbag device installed in a side section at the vehicle width direction outside of a seatback of a vehicle.

Moreover, various modifications may be implemented within a range not departing from the spirit of the present invention. Obviously, the scope of rights of the present invention is not limited by the previous exemplary embodiment or any of the modified examples.

What is claimed is:

1. A vehicle side airbag device comprising:
an inflator that operates to generate gas;
an airbag that is provided at a side section of a seatback of a vehicle seat, that inflates and deploys using gas generated by the inflator, that protects an occupant from at least a head to an abdominal region, and in which, in an inflated and deployed state,
   a rearward sloping portion configured by a location at a lower end side of a front edge portion of the airbag extends diagonally toward a vehicle upper rear on progression from a lower end toward an upper end of the rearward sloping portion, and in which, in the inflated and deployed state,
   upper portion sides of a front edge portion and a rear edge portion extend substantially parallel to an up-down direction of the vehicle; and
a flow regulating section that is provided at a lower section of the airbag, and that ejects gas generated by the inflator from an upper ejection opening toward an upper section side of the airbag, and from a lower ejection opening along a lower edge portion of the airbag toward a rearward sloping portion side, wherein an opening surface area of the lower ejection opening is set larger than an opening surface area of the upper ejection opening.

2. A vehicle side airbag device comprising:
an inflator that operates to generate gas;
an airbag that is provided at a side section of a seatback of a vehicle seat, that inflates and deploys using gas generated by the inflator, that protects an occupant from at least a head to an abdominal region, and in which, in an inflated and deployed state,
   a rearward sloping portion configured by a location at a lower end side of a front edge portion of the airbag extends diagonally toward a vehicle upper rear on progression from a lower end toward an upper end of the rearward sloping portion, and in which, in the inflated and deployed state,
   upper portion sides of a front edge portion and a rear edge portion extend substantially parallel to an up-down direction of the vehicle; and
a flow regulating section that is provided at a lower section of the airbag, and that ejects gas generated by the inflator from an upper ejection opening toward an upper section side of the airbag, and from a lower ejection opening along a lower edge portion of the airbag toward a rearward sloping portion side;
the airbag is partitioned by a partitioning section serving as the flow regulating section into a rear bag section that protects rear portions of a chest region and the abdominal region of the occupant, and into a front bag section that protects front portions of the chest region and the abdominal region of the occupant, and the head of the occupant;
the inflator is housed inside the rear bag section; and
the inside of the front bag section and the inside of the rear bag section are placed in communication with each other by the upper ejection opening formed at an upper end portion of the partitioning section, and the lower ejection opening formed at a lower end portion of the partitioning section.

3. The vehicle side airbag device of claim 1, wherein an angle formed between a front end portion of the lower edge portion of the airbag, and a lower end portion of the rearward sloping portion is set at a right angle or an acute angle.

4. The vehicle side airbag device of claim 1, wherein:
the airbag includes a curved portion provided between a front end of the lower edge portion and the lower end of the rearward sloping portion; and
the curved portion is formed in a curved shape forming a bulge toward a vehicle front side in the inflated and deployed state.

5. The vehicle side airbag device of claim 2, wherein:
the upper ejection opening places an upper end portion inside the rear bag section and an upper portion inside the front bag section in communication with each other along an up-down direction of the airbag; and
the lower ejection opening places a lower end portion inside the rear bag section and a lower end portion inside the front bag section in communication with each other along a front-rear direction of the airbag.

6. The vehicle side airbag device of claim 2, wherein:
an opening surface area of the lower ejection opening is set larger than an opening surface area of the upper ejection opening.

7. The vehicle side airbag device of claim 2, wherein:
in the inflated and deployed state of the airbag, a shoulder restraint portion provided at an upper portion of the rear bag section projects out further toward a front side of the seatback than a lower portion of the rear bag section.

8. The vehicle side airbag device of claim 2, wherein:
the partitioning section is a tether;
in the inflated and deployed state of the airbag, the tether includes a crosswise extension portion extending from an up-down direction intermediate portion of a rear edge portion of the airbag toward a vehicle front side, and an upright extension portion extending from a front-rear direction intermediate portion of the lower edge portion of the airbag toward an upper side of the seatback; and the upright extension portion is set parallel, or substantially parallel, to the rearward sloping portion in the inflated and deployed state of the airbag.

9. The vehicle side airbag device of claim 8, wherein:

the tether also includes a circular arc shaped portion provided between a front end of the crosswise extension portion and an upper end of the upright extension portion; and the circular arc shaped portion is set projecting out further toward the vehicle front side than the upright extension portion in the inflated and deployed state of the airbag.

10. The vehicle side airbag device of claim 1, wherein:

the airbag includes a loop diffuser as the flow regulating section; and the loop diffuser is formed with a truncated cone shaped external profile that increases in diameter on progression from an upper end opening as the upper ejection opening toward a lower end opening as the lower ejection opening.

11. The vehicle side airbag device of claim 1, wherein:

the airbag is a far side airbag that is installed to a vehicle center-side side support section of the seatback.

* * * * *